United States Patent
Siw et al.

(10) Patent No.: US 11,852,029 B2
(45) Date of Patent: Dec. 26, 2023

(54) SCOOP ASSEMBLY FOR ROTATIONAL EQUIPMENT

(71) Applicant: Raytheon Technologies Corporation, Farmington, CT (US)

(72) Inventors: Sin Chien Siw, Simsbury, CT (US); Charles J. Banas, Norwich, CT (US); Timothy Castaldo, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 695 days.

(21) Appl. No.: 16/993,758

(22) Filed: Aug. 14, 2020

(65) Prior Publication Data

US 2022/0049625 A1     Feb. 17, 2022

(51) Int. Cl.
| | |
|---|---|
| *F01D 25/18* | (2006.01) |
| *F16N 7/00* | (2006.01) |

(52) U.S. Cl.
CPC ............ *F01D 25/186* (2013.01); *F16N 7/00* (2013.01); *F05D 2260/98* (2013.01)

(58) Field of Classification Search
CPC ....... F01D 25/186; F16N 7/00; F05D 2260/98
See application file for complete search history.

(56) References Cited

U.S. PATENT DOCUMENTS

| | | | |
|---|---|---|---|
| 4,648,485 A | 3/1987 | Kovaleski | |
| 8,464,835 B2 | 6/2013 | Munson | |
| 9,989,083 B2 | 6/2018 | Labbe | |
| 10,047,649 B2 | 8/2018 | Lucas | |
| 10,113,429 B2 | 10/2018 | McDonagh | |
| 10,352,456 B2 | 7/2019 | Amador | |
| 10,526,907 B2 | 1/2020 | Blais | |
| 10,570,776 B2 | 2/2020 | Von Berg | |
| 10,612,415 B2 | 4/2020 | Duong | |
| 10,662,812 B2 | 5/2020 | Walker | |
| 2014/0241851 A1 | 8/2014 | Demitraszek | |
| 2014/0369832 A1* | 12/2014 | Blais | F01D 25/12 277/306 |
| 2016/0281527 A1 | 9/2016 | Lucas | |
| 2016/0281602 A1* | 9/2016 | Gekht | F01D 25/18 |
| 2016/0348522 A1 | 12/2016 | Labbe | |
| 2019/0120085 A1 | 4/2019 | Walker | |
| 2020/0095891 A1 | 3/2020 | Walsh | |
| 2020/0256211 A1* | 8/2020 | Davis | F16J 15/3404 |
| 2020/0291818 A1* | 9/2020 | Davis | F01M 11/02 |
| 2021/0040888 A1* | 2/2021 | Coffin | F02C 7/06 |

OTHER PUBLICATIONS

EP search report for EP21191554.1 dated May 6, 2022.

* cited by examiner

*Primary Examiner* — Minh Truong
*Assistant Examiner* — Mark K Buse
(74) *Attorney, Agent, or Firm* — GETZ BALICH LLC

(57) ABSTRACT

An assembly is provided for rotational equipment. This assembly includes a first rotatable body and an injector. The first rotatable body extends axially along and circumferentially about a rotational axis. The first rotatable body includes a first scoop with a first scoop aperture that extends obliquely through the first rotatable body. The injector includes a first nozzle orifice and a second nozzle orifice. The injector is configured to direct a first fluid jet from the first nozzle orifice into an inlet of the first scoop aperture. The injector is further configured to direct a second fluid jet from the second nozzle orifice into the inlet of the first scoop aperture.

19 Claims, 11 Drawing Sheets

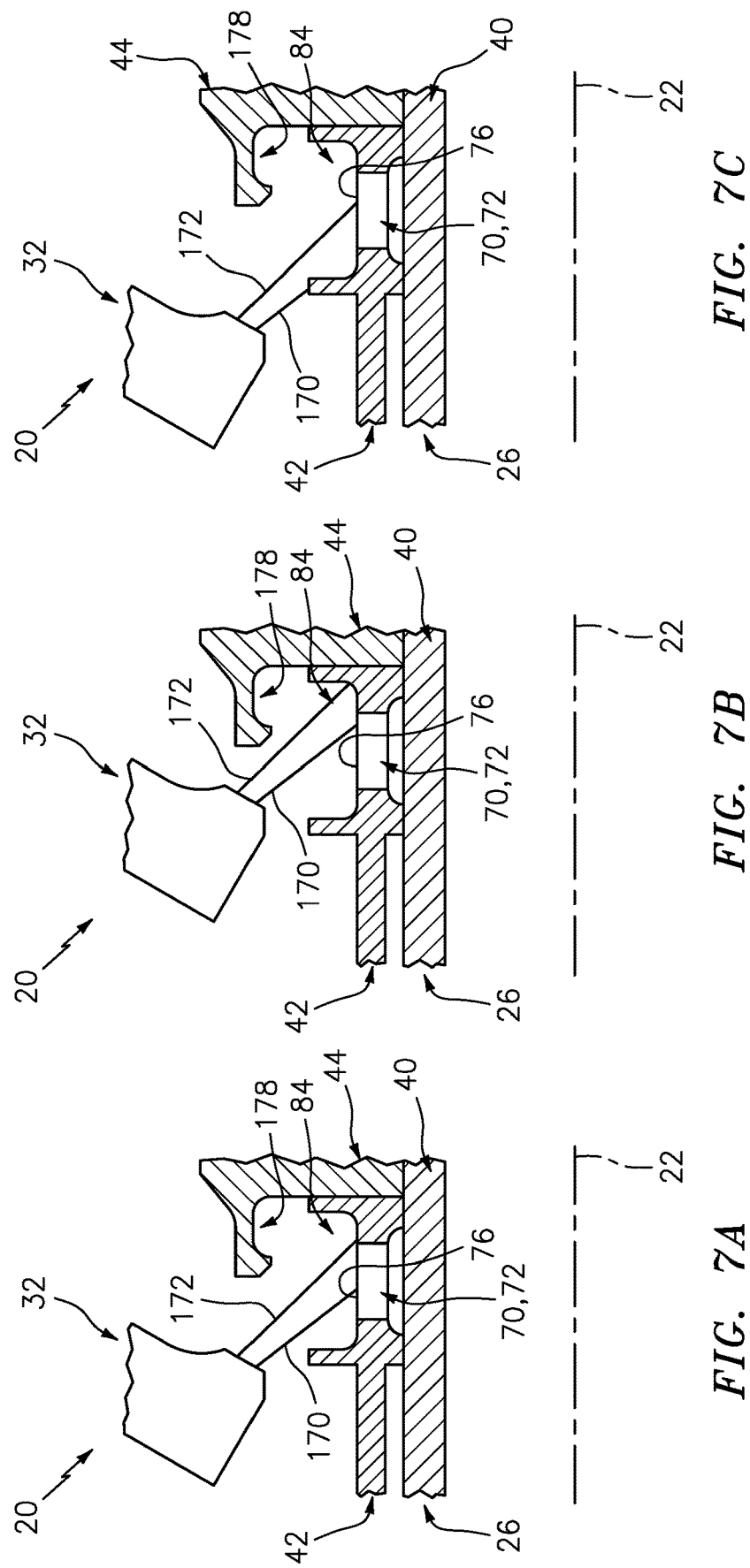

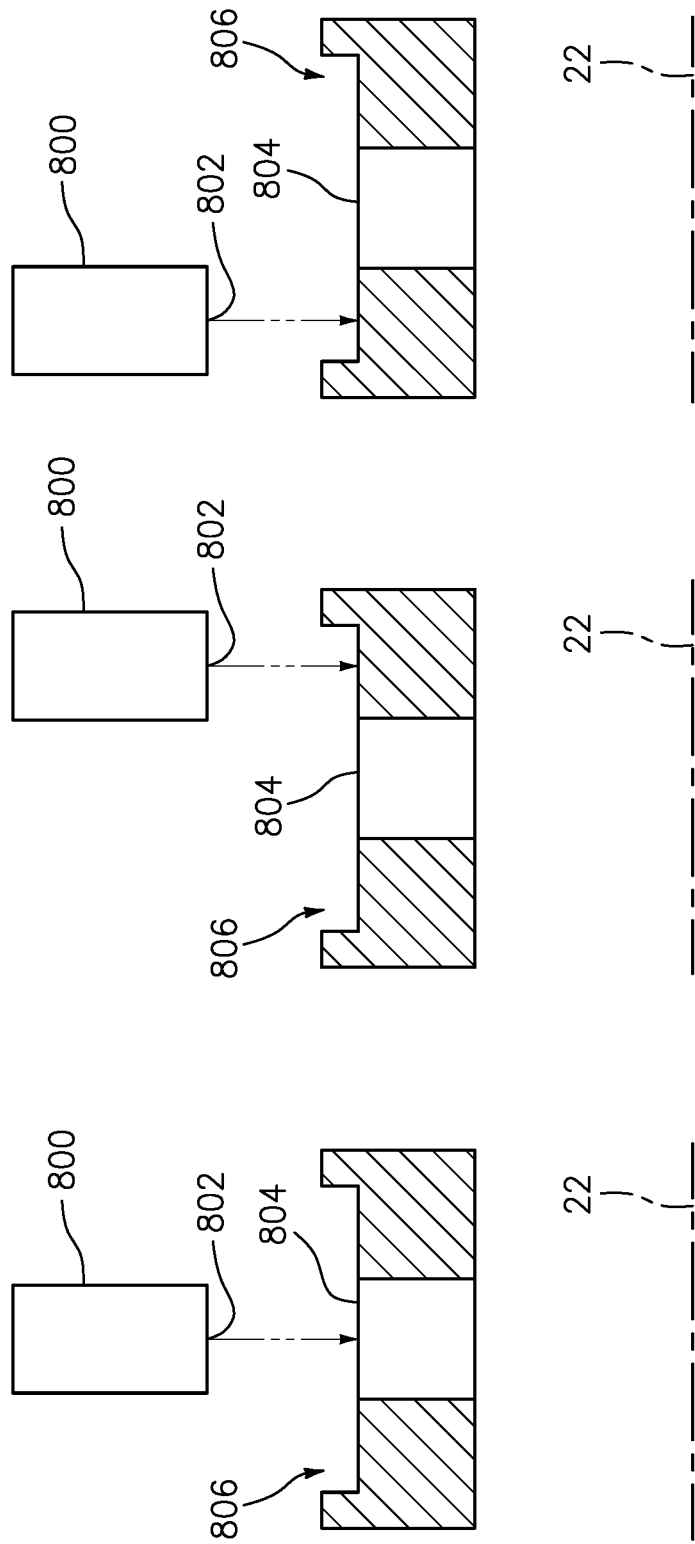

SCOOP ASSEMBLY FOR ROTATIONAL EQUIPMENT

BACKGROUND OF THE DISCLOSURE

1. Technical Field

This disclosure relates generally to rotational equipment and, more particularly, to a scooping fluid within rotational equipment.

2. Background Information

Rotational equipment such as a gas turbine engine may include a radial scoop for collecting lubricant injected into a compartment from a nozzle. Various types and configurations of radial scoops are known in the art. While these known radial scoops have various advantages, there is still room in the art for improvement. There is a need in the art therefore for an improved scoop assembly for rotational equipment.

SUMMARY OF THE DISCLOSURE

According to an aspect of the present disclosure, an assembly is provided for rotational equipment. This assembly includes a first rotatable body and an injector. The first rotatable body extends axially along and circumferentially about a rotational axis. The first rotatable body includes a first scoop with a first scoop aperture that extends obliquely through the first rotatable body. The injector includes a first nozzle orifice and a second nozzle orifice. The injector is configured to direct a first fluid jet from the first nozzle orifice into an inlet of the first scoop aperture. The injector is also configured to direct a second fluid jet from the second nozzle orifice into the inlet of the first scoop aperture.

According to another aspect of the present disclosure, another assembly is provided for rotational equipment. This assembly includes a first tubular body and an injector. The first tubular body is configured to rotate about a rotational axis. The first tubular body includes a first scoop aperture with a first scoop aperture inlet and a first scoop aperture outlet. The first scoop aperture extends from the first scoop aperture inlet at a radial outer surface of the first tubular body to the first scoop aperture outlet at a radial inner surface of the first tubular body. The injector includes a first nozzle orifice and a second nozzle orifice. The injector is configured to direct a first fluid jet from the first nozzle orifice to a first target location that is coincident with the first scoop aperture inlet. The injector is also configured to direct a second fluid jet from the second nozzle orifice to a second target location that is coincident with the first scoop aperture inlet.

According to still another aspect of the present disclosure, another assembly is provided for rotational equipment. This assembly includes a first rotatable body and a second rotatable body. The first rotatable body extends axially along and circumferentially about a rotational axis. The first rotatable body includes a first scoop with a first scoop aperture that extends obliquely through the first rotatable body. The second rotatable body extends axially along and circumferentially about the rotational axis. The second rotatable body includes a second scoop with a scoop arm projecting axially out from a base of the second rotatable body. The scoop arm axially overlaps at least a portion of an inlet to the first scoop aperture. The second scoop is configured to collect fluid that splashes off of the first rotatable body.

The rotational equipment may be configured as or otherwise include a gas turbine engine.

The base of the second rotatable body may be abutted axially against the first rotatable body.

The assembly may also include a lubricant injector configured to direct a first lubricant jet at the inlet of the first scoop aperture when the first rotatable body is at a first rotational position about the rotational axis. The second scoop may be configured to collect lubricant from the first lubricant jet that splashes off of the first rotatable body when the first rotatable body is at a second rotational position about the rotational axis.

The first rotatable body may also include a second scoop with a second scoop aperture that extends obliquely through the first rotatable body. The injector may be configured to direct the first fluid jet from the first nozzle orifice into an inlet of the second scoop aperture. The injector may also be configured to direct the second fluid jet from the second nozzle orifice into the inlet of the second scoop aperture.

The first scoop aperture may extend obliquely through the rotatable body along a first scoop aperture centerline. The first scoop aperture centerline may include, relative to the rotational axis, a circumferential component and a radial component.

The first scoop may also include a scoop channel fluidly coupled with the first scoop aperture. The scoop channel may project radially towards the rotational axis into the first rotatable body. The scoop channel may extend circumferentially within the first rotatable body.

The scoop channel may extend circumferentially within the first rotatable body to the inlet of the first scoop aperture.

The first scoop may also include a scoop channel fluidly coupled with the first scoop aperture. The scoop channel may project radially away from the rotational axis into the first rotatable body. The scoop channel may extend circumferentially within the first rotatable body.

The scoop channel may also extend axially into the first rotatable body.

The assembly may also include an additional rotatable body extending axially along and circumferentially about the rotational axis. The additional rotatable body may be abutted axially against the first rotatable body. The first rotatable body may be configured to direct fluid received from the first nozzle orifice and the second nozzle orifice to the additional rotatable body.

The additional rotatable body may be configured as or otherwise include an inner race of a bearing.

The assembly may also include a second rotatable body extending axially along and circumferentially about the rotational axis. A base of the second rotatable body may be abutted axially against the first rotatable body. The second rotatable body may be configured as or otherwise include a second scoop with a scoop arm projecting axially out from the base of the second rotatable body.

The scoop arm may axially overlap at least a portion of the first scoop.

The second scoop may be configured to collect fluid from at least one of the first fluid jet or the second fluid jet that splashes off of the first rotatable body.

The second rotatable body may also be configured as or otherwise include a seal land.

The injector may be configured to direct the first fluid jet from the first nozzle orifice to a first target location on the first rotatable body which is at least partially axially aligned with the inlet when the first rotatable body is at a first rotational position about the rotational axis. The injector may also be configured to direct the second fluid jet from the second nozzle orifice to a second target location on the first rotatable body which is at least partially axially aligned with the inlet when the first rotatable body is at the first rotational position about the rotational axis. The first target location and the second target location may be discretely arranged axially along the rotational axis.

The first target location and the second target location may be circumferentially aligned about the rotational axis.

The assembly may also include a gas turbine engine rotating assembly. The gas turbine engine rotating assembly may include the first rotatable body. The rotational equipment may be configured as or otherwise include a gas turbine engine.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 7A-C are partial side sectional illustrations of a portion of the rotational equipment assembly of FIG. 1 during different operating conditions resulting in slight axial displacement of a rotating assembly relative to a fluid injector.

FIGS. 8A-C are partial side sectional illustrations of a portion of another rotational equipment assembly during different operating conditions resulting in slight axial displacement of a rotating assembly relative to a fluid injector.

DETAILED DESCRIPTION

Figure 1:
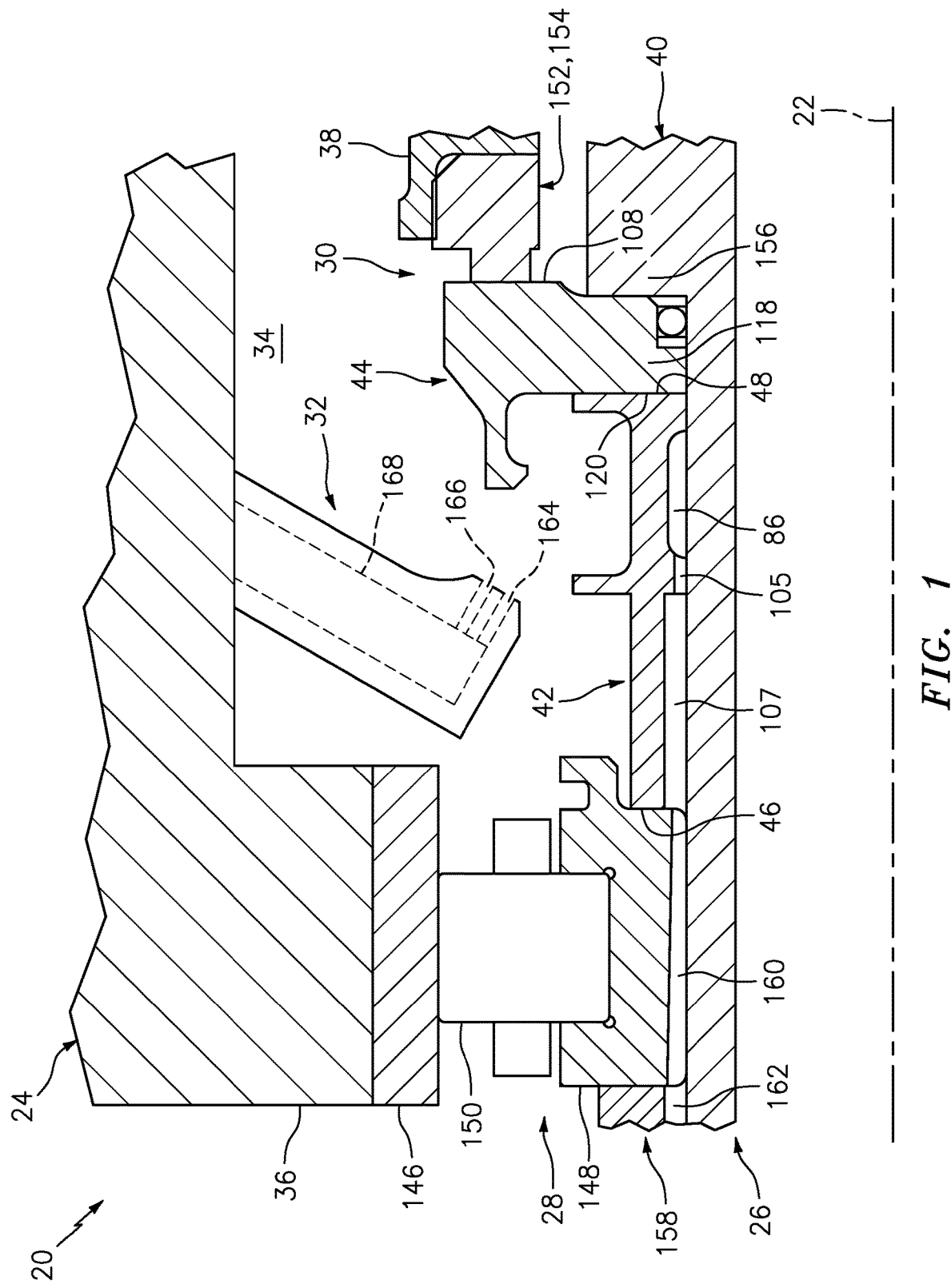
FIG. 1 is a partial side sectional illustration of an assembly for rotational equipment.

FIG. 1 illustrates an assembly 20 for rotational equipment with an axial centerline 22, which centerline 22 may also be an axis of rotation (e.g., a rotational axis) for one or more components of the rotational equipment assembly 20. An example of such rotational equipment is a geared or direct-drive (e.g., turbofan or turbojet) gas turbine engine for an aircraft propulsion system, an exemplary embodiment of which is described below in further detail (e.g., see FIG. 9). However, the rotational equipment assembly 20 of the present disclosure is not limited to such an aircraft or gas turbine engine application. The rotational equipment assembly 20, for example, may alternatively be configured with rotational equipment such as an industrial gas turbine engine, a wind turbine, a water turbine or any other apparatus in which fluid injected into a plenum by at least one injector is collected by a rotating scoop.

The rotational equipment assembly 20 of FIG. 1 includes a static structure 24, a rotating assembly 26 and at least one bearing 28 for rotatably supporting the rotating assembly 26 relative to the static structure 24. The rotational equipment assembly 20 of FIG. 1 also includes a seal assembly 30 and at least one fluid injector 32; e.g., a lubricant injector.

The static structure 24 is configured as a stationary part of the rotational equipment. The static structure 24 of FIG. 1, for example, is configured to at least partially form an internal bearing compartment 34 for housing at least the bearing 28 (or any other plenum). This static structure 24 includes a bearing support 36 such as, but not limited to, a strut. The static structure 24 also includes a seal assembly support (e.g., an annular wall) to which a (e.g., adjustable, spring loaded) carrier 38 for the seal assembly may be mounted.

The rotating assembly 26 of FIG. 1 includes at least a rotatable base structure 40, a first rotatable body 42 and a second rotatable body 44. The rotating assembly 26 and its rotatable components 40, 42 and 44 are each configured to rotate about a common rotational axis, in the embodiment of FIG. 1 the axial centerline 22.

The rotatable base structure 40 of FIG. 1 is configured as a tubular shaft. However, in other embodiments, the rotatable base structure 40 may be configured as another component (e.g., a sleeve) mounted to and rotatable with a shaft of the rotational equipment, or any other rotor within the rotational equipment. The rotatable base structure 40 of FIG. 1 extends axially along the axial centerline 22 through (or partially into or within) the static structure 24. The static structure 24 of FIG. 1 thereby extends circumferentially about (e.g., completely around) the axial centerline 22 and the rotating assembly 26 and its rotatable base structure 40.

Figure 2:
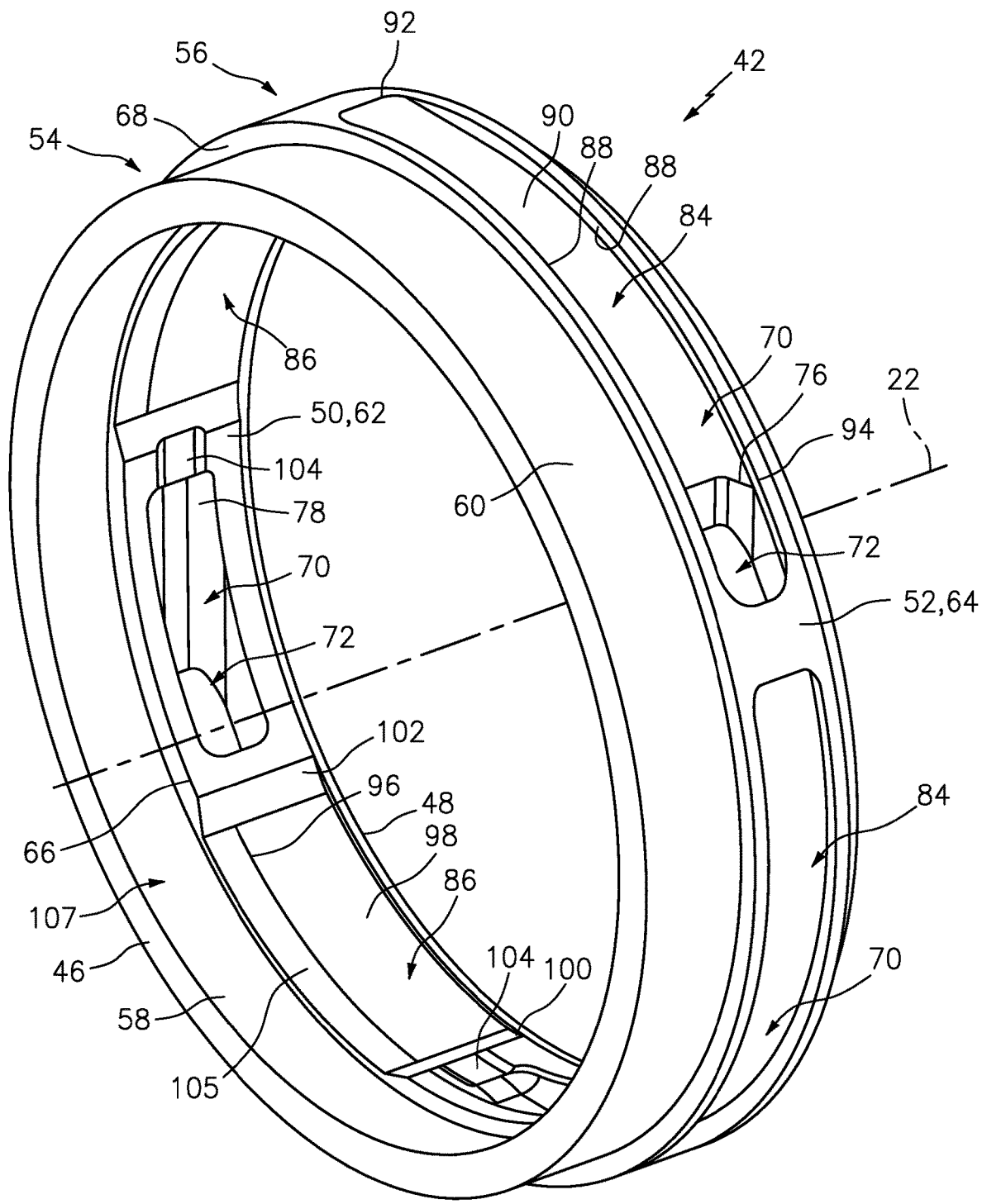
FIG. 2 is a perspective illustration of a rotatable body with one or more radial scoops.

The first rotatable body 42 is configured as a scoop element; e.g., a radial scoop element (see also FIG. 2). The first rotatable body 42 may also be configured as an intermediate element for locating two other axially adjoining elements (e.g., the bearing 28 and the second rotatable body 44) relative to one another. The first rotatable body 42, for example, may also be configured as a shaft spacer, a runner, a sleeve, etc.

The first rotatable body 42 is configured as a tubular body with an inner bore configured to receive the rotatable base structure 40. The first rotatable body 42 of FIG. 2, for example, extends axially along the axial centerline 22 between and to an axial first end 46 and an axial second end 48. The first rotatable body 42 extends circumferentially about (e.g., completely around) the axial centerline 22. The first rotatable body 42 extends radially between and to a radial inner side 50 and a radial outer side 52.

The first rotatable body 42 of FIG. 2 includes a tubular spacer portion 54 and a tubular scoop portion 56. The spacer portion 54 is arranged at (e.g., on, adjacent or proximate) the first rotatable body first end 46. The scoop portion 56 is arranged at (e.g., on, adjacent or proximate) the first rotatable body second end 48.

The spacer portion 54 of FIG. 2 extends axially along the axial centerline 22 from the first rotatable body first end 46 to the scoop portion 56. The spacer portion 54 extends radially between and to a (e.g., tubular) radial inner surface 58 and a (e.g., tubular) radial outer surface 60. The spacer portion inner surface 58 is radially recessed (in an outward direction away from the axial centerline 22) from the first rotatable body inner side 50; e.g., a radius of the spacer portion inner surface 58 is greater than a radius of the first rotatable body inner side 50. The spacer portion outer surface 60 is radially recessed (in an inward direction towards the axial centerline 22) from the first rotatable body outer side 52; e.g., a radius of the spacer portion outer surface 60 is less than a radius of the first rotatable body outer side 52. The present disclosure, however, is not limited to such an exemplary relationship.

The scoop portion 56 of FIG. 2 extends axially along the axial centerline 22 from the first rotatable body second end 48 to the spacer portion 54. The scoop portion 56 extends radially between and to a (e.g., generally tubular) radial inner surface 62 and a (e.g., generally tubular) radial outer surface 64. The scoop portion inner surface 62 is located at the first rotatable body inner side 50; thus, a radius of the scoop portion inner surface 62 is less than the radius of the spacer portion inner surface 58. An (e.g., annular) inner shelf surface 66 may thereby extend radially between and to the scoop portion inner surface 62 and the spacer portion inner surface 58. The scoop portion outer surface 64 is located at the first rotatable body outer side 52; thus, a radius of the scoop portion outer surface 64 is greater than the radius of the spacer portion outer surface 60. An (e.g., annular) outer shelf surface 68 may thereby extend radially between and to the scoop portion outer surface 64 and the spacer portion outer surface 60. Of course, in other embodiments, the inner surfaces 58 and 62 may be configured as a single inner surface and/or the outer surfaces 60 and 64 may be configured as a single outer surface, or otherwise.

The scoop portion 56 of FIG. 2 includes one or more first rotatable body scoops 70; e.g., radial scoops. These first rotatable body scoops 70 are arranged at discrete circumferential locations about the axial centerline 22 in an annular array.

Figure 3:
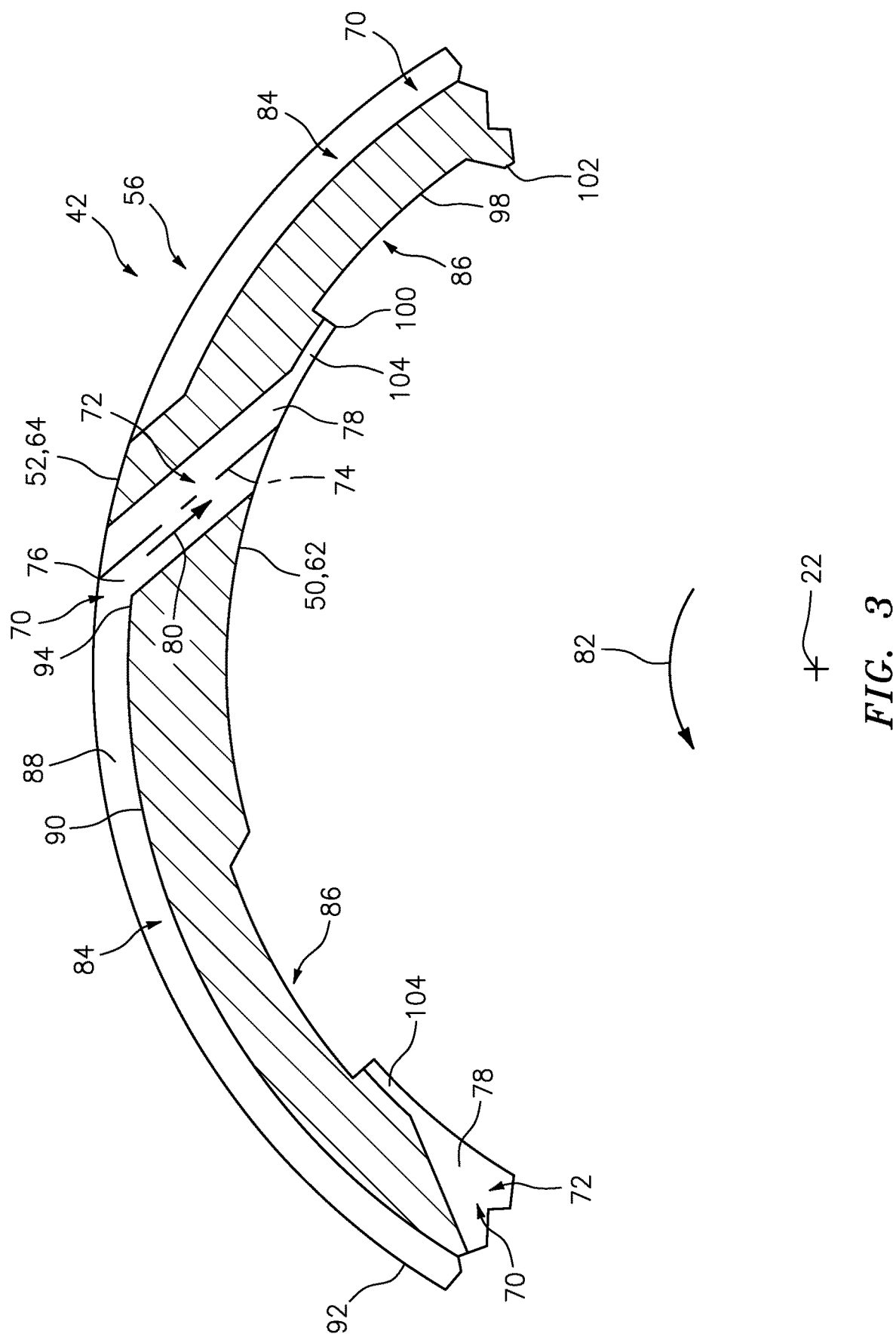
FIG. 3 is a cross-sectional illustration of a portion of the rotatable body of FIG. 2.

Referring to FIG. 3, each of the first rotatable body scoops 70 is configured to receive and/or collect fluid (e.g., lubricant) at the first rotatable body outer side 52 and direct that fluid to the first rotatable body inner side 50. Each first rotatable body scoop 70 of FIG. 2, for example, includes a first scoop aperture 72 (e.g., a through hole) which extends longitudinally along a longitudinal first scoop aperture centerline 74 from an inlet 76 (e.g., an orifice) of the first scoop aperture 72 to an outlet 78 (e.g., an orifice) of the first scoop aperture 72, where the first scoop aperture inlet 76 is at the outer side 52 and/or the outer surface 64 and the first scoop aperture outlet 78 is at the inner side 50 and/or the inner surface 62.

The first scoop aperture centerline 74 may have a (e.g., non-zero) radial component and a (e.g., non-zero) circumferential component. The first scoop aperture centerline 74 and, thus, the first scoop aperture 72 may thereby extend obliquely (e.g., diagonally) through the first rotatable body 42, for example, a plane perpendicular to the axial centerline 22; e.g., plane of FIG. 3. The first scoop aperture centerline 74 of each first scoop aperture 72 may lie in a common plane; e.g., the plane perpendicular to the axial centerline 22. The first scoop aperture centerline 74 may therefore have no (e.g., a zero) axial component. In other embodiments, however, the first scoop aperture centerline 74 may also have a (e.g., non-zero) axial component.

Typically, a trajectory 80 of the first scoop aperture 72 from its inlet 76 to its outlet 78 will extend in a circumferential direction opposite to a direction of rotation 82 of the rotating assembly 26. However, in other embodiments, the trajectory 80 of the first scoop aperture 72 from its inlet 76 to its outlet 78 may extend in a circumferential direction common to the direction of rotation 82 of the rotating assembly 26.

Each first rotatable body scoop 70 of FIG. 2 also includes an outer channel 84 (e.g., an inlet/capture channel) and an inner channel 86 (e.g., an outlet/supply channel). The outer channel 84 is positioned circumferentially forward/upstream of the first scoop aperture inlet 76. The outer channel 84 extends axially between opposing axial channel sidewalls 88. The outer channel 84 extends radially (in an inward direction towards the axial centerline 22) partially into the first rotatable body 42 from the scoop portion outer surface 64 to a radial channel sidewall 90. The outer channel 84 extends circumferentially within the first rotatable body 42 from a forward/upstream channel end 92 to an aft/downstream channel end 94. The outer channel 84 is fluidly coupled with and upstream of the respective first scoop aperture inlet 76. The aft/downstream channel end 94 of FIG. 3, for example, is located at the first scoop aperture inlet 76. The outer channel 84 of FIG. 3 may thereby extend circumferentially within the first rotatable body 42 to the first scoop aperture inlet 76. The present disclosure, however, is not limited to such an exemplary direct fluid coupling.

The inner channel 86 is positioned circumferentially aft/downstream of the first scoop aperture outlet 78. The inner channel 86 extends axially partially into the first rotatable body 42 from the first rotatable body second end 48 to an axial channel sidewall 96. The inner channel 86 extends radially (in an outward direction away from the axial centerline 22) partially into the first rotatable body 42 from the scoop portion inner surface 62 to a radial channel sidewall 98. The inner channel 86 extends circumferentially within the first rotatable body 42 from a forward/upstream channel end 100 to an aft/downstream channel end 102. The inner channel 86 is fluidly coupled with and downstream of the respective first scoop aperture outlet 78. A notch 104 in the scoop portion inner surface 62, for example, may extend circumferentially between and thereby fluidly couple the inner channel 86 at its forward/upstream channel end 100 and the respective first scoop aperture outlet 78. The present disclosure, however, is not limited to such an exemplary indirect fluid coupling.

Figure 2B:
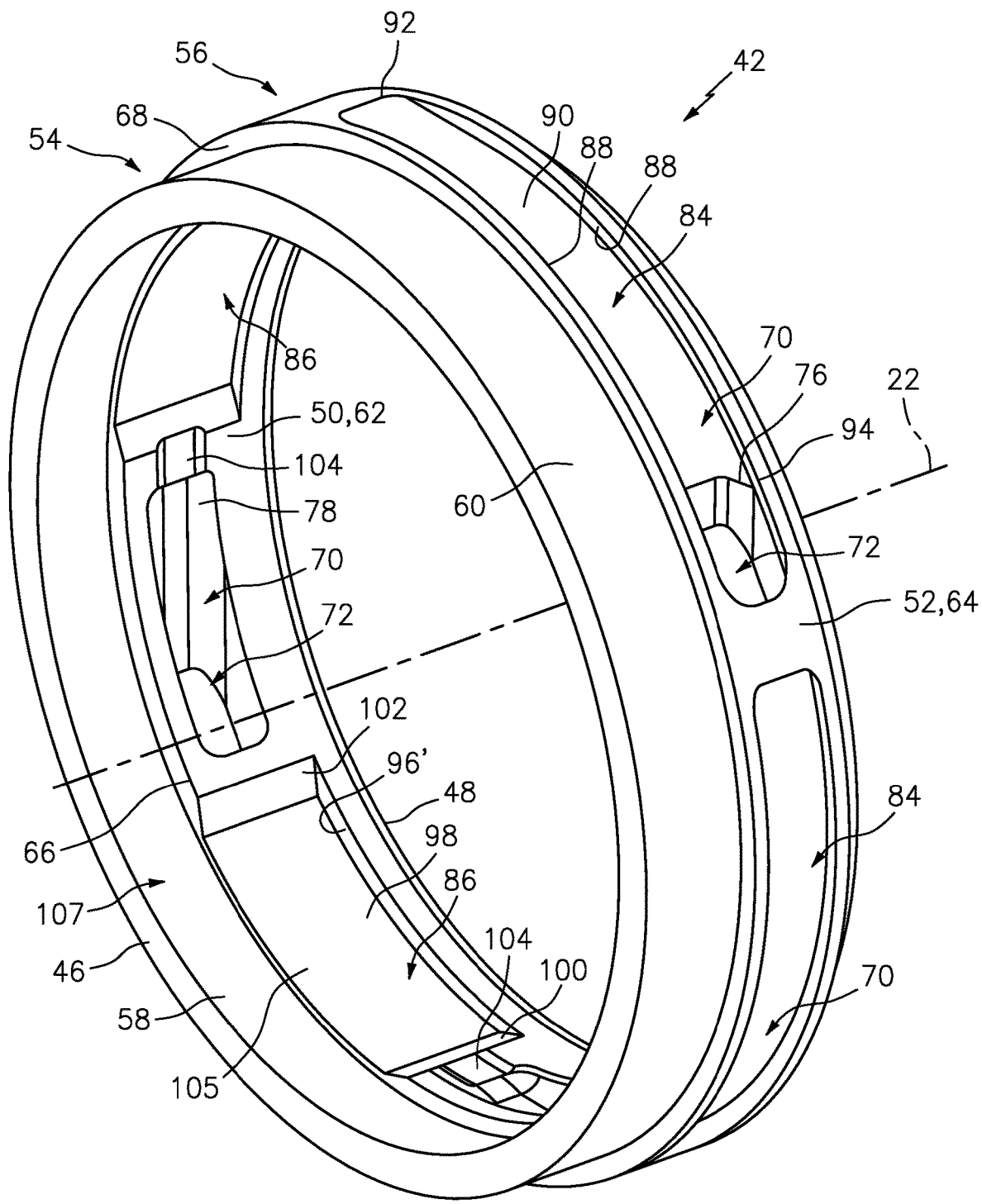
FIG. 2B is a perspective illustration of another rotatable body with one or more radial scoops.

Referring to FIG. 2, the first rotatable body 42 also includes one or more fluid couplings 105 (one visible in FIG. 2). Examples of such fluid couplings include, but are not limited to, channels, notches, through-holes, etc. Each fluid coupling 105 of FIG. 2, for example, is arranged at the inner side 50 and projects partially radially into the first rotatable body 42 from the inner surface 62. Each fluid coupling 105 also extends axially through the first rotatable body 42. Each fluid coupling 105 of FIG. 2 may thereby fluidly couple a respective one of the inner channels 86 with, for example, an annular plenum 107 radially bounded by the spacer portion inner surface 58; see also FIG. 1. Of course, in other embodiments, each coupling 105 may alternatively be configured as an extension of the entire respective inner channel 86 axially to the inner shelf surface 66 as shown in FIG. 2B. In addition, one or more or each inner channel 86 may extend axially partially into the first rotatable body 42 from the inner shelf surface 66 to an axial channel sidewall 96'.

Referring to FIG. 1, the second rotatable body 44 is configured as another scoop element; e.g., an axial scoop. The second rotatable body 44 may also or alternatively be configured as a seal land for the seal assembly 30.

The second rotatable body 44 is configured as a tubular body with an inner bore configured to receive the rotatable base structure 40. The second rotatable body 44 of FIG. 4, for example, extends circumferentially about (e.g., completely around) the axial centerline 22. Referring to FIGS.

5A and 5B, the second rotatable body 44 extends axially along the axial centerline 22 between and to an axial first end 106 and an axial second end 108. The first rotatable body 42 extends radially between and to a radial inner side 110 and a radial outer side 112.

Figure 5B:
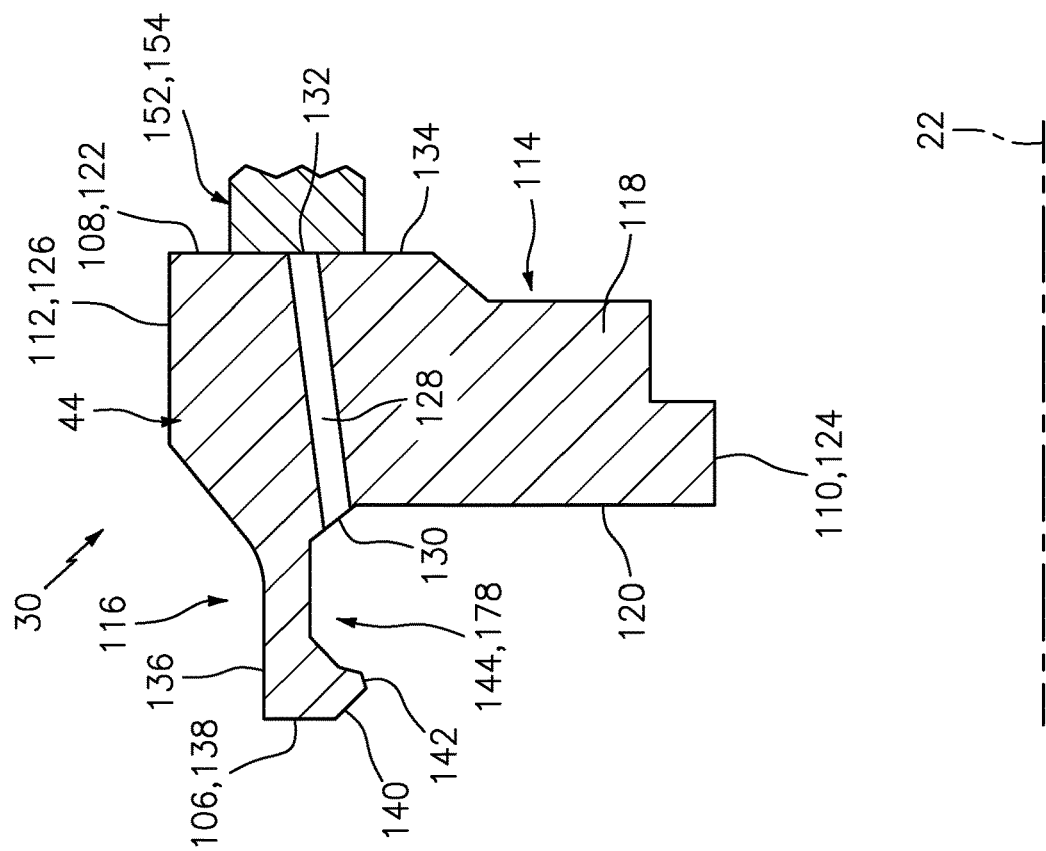
FIGS. 5A and 5B are partial side sectional illustrations of a seal assembly with the rotatable body of FIG. 4 at different circumferential positions about an axial centerline.
Figure 5A:
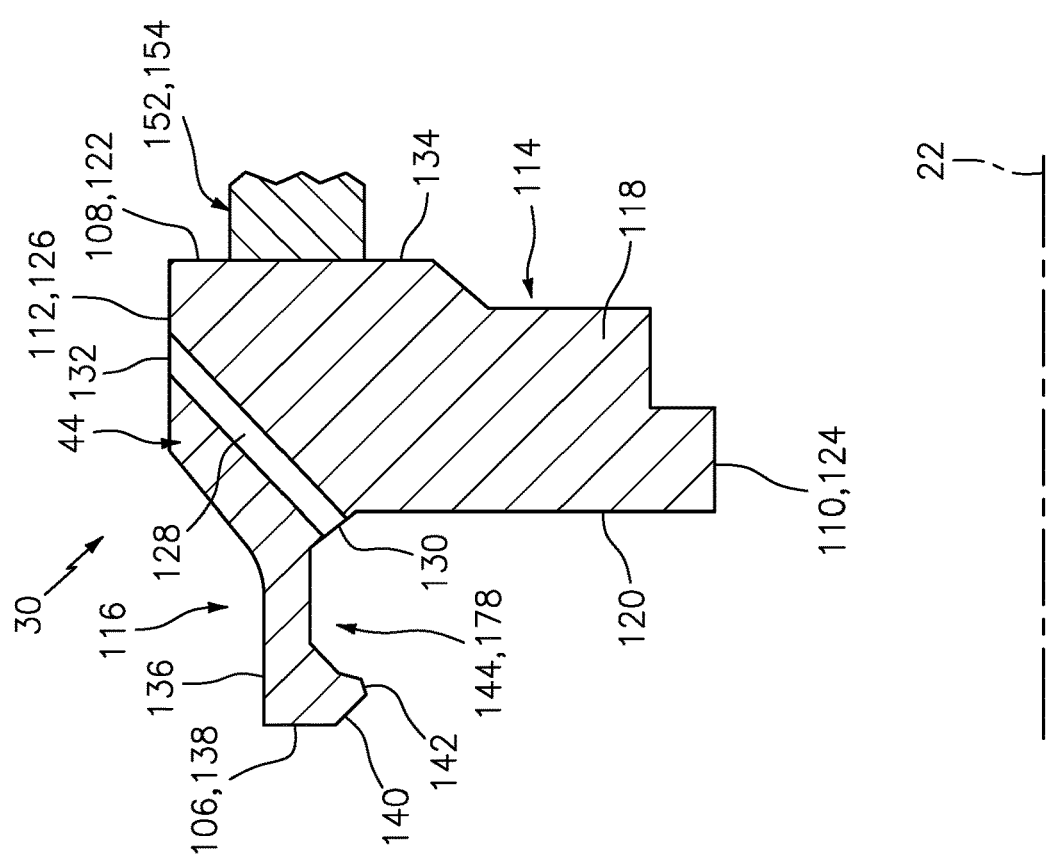

The second rotatable body 44 of FIGS. 5A and 5B includes a tubular seal land portion 114 and a tubular scoop portion 116 which forms a second rotatable body scoop 178; e.g., an axial scoop. The seal land portion 114 is arranged at (e.g., on, adjacent or proximate) the second rotatable body second end 108. The scoop portion 116 is arranged at (e.g., on, adjacent or proximate) the second rotatable body first end 106.

The seal land portion 114 forms a base 118 of the second rotatable body 44. This base 118 extends axially along the axial centerline 22 between opposing first and second base ends 120 and 122. The base 118 extends radially between and to a (e.g., tubular) radial inner surface 124 and a (e.g., tubular) radial outer surface 126. The base inner surface 124 is at the second rotatable body inner side 110. The base outer surface 126 is at the second rotatable body outer side 112.

Figure 4:
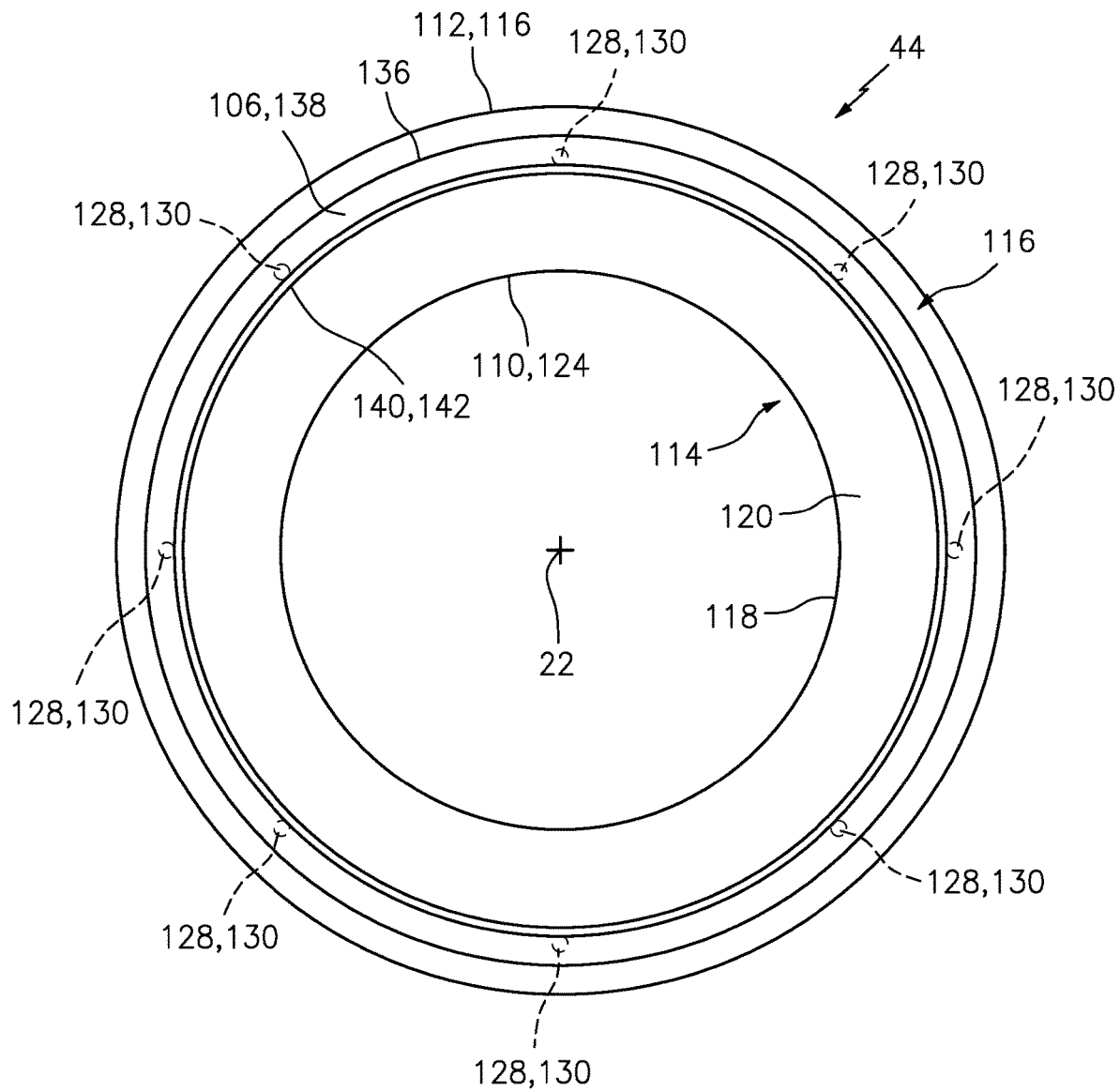
FIG. 4 is an end view illustration of a rotatable body with an axial scoop.

Referring to FIGS. 4-5B, the base 118 includes one or more internal fluid passages 128 (shown by dashed lines in FIG. 4). Referring to FIGS. 5A and 5B, each fluid passage 128 extends through the second rotatable body 44 between and to an inlet 130 and an outlet 132. The fluid passage inlets 130 are arranged circumferentially about the axial centerline 22; best shown in FIG. 4. Each fluid passage inlet 130 may be arranged at the first base end 120 and/or at an intersection between the seal land portion 114 and the scoop portion 116. One or more or each of the fluid passage outlets 132 may be arranged at the base outer surface 126; e.g., as shown in FIG. 5A. One or more or each of the fluid passage outlets 132 may be arranged at a (e.g., annular, radially extending) seal land surface 134 of the second rotatable body 44 and its base 118; e.g., as shown in FIG. 5B.

The scoop portion 116 includes an (e.g., tubular) axial scoop arm 136. This scoop arm 136 projects axially along the axial centerline 22 out from the base 118 to an axial distal arm end 138 at the second rotatable body first end 106. The scoop arm 136 includes an annular rim 140 at its distal arm end 138, which rim 140 projects radially (in an inward direction towards the axial centerline 22) to a radial distal rim edge 142. With this rim 140, the second rotatable body 44 is configured with a (e.g., annular) channel 144 axially between the rim 140 and the base 118. This channel 144 and, more generally, the second rotatable body scoop 178 are configured for collecting fluid (e.g., lubricant) as discussed below in further detail.

Referring to FIG. 1, the bearing 28 may be configured as a roller element bearing. The bearing 28 of FIG. 1, for example, includes an annular outer race 146, an annular inner race 148 and a plurality of bearing elements 150; e.g., cylindrical or spherical elements. The outer race 146 circumscribes the inner race 148 and the bearing elements 150. The outer race 146 is mounted to the static structure 24 and, more particularly, the bearing support 36. The inner race 148 circumscribes and is mounted to the rotatable base structure 40. The bearing elements 150 are arranged in an annular array about the axial centerline 22, which array is radially between and engaged with the outer race 146 and the inner race 148. The present disclosure, however, is not limited to the foregoing exemplary bearing configuration. For example, in other embodiments, the bearing 28 may alternatively be configured as a journal bearing or any other type of bearing utilized in the rotational equipment.

The seal assembly 30 includes the second rotatable body 44 and a non-rotating body 152. The non-rotating body 152 of FIG. 1 is configured as a (e.g., annular) seal element 154 such as, but not limited to, a carbon seal element. This seal element 154 is configured to (e.g., axially) contact the second rotatable body 44 and its seal land surface 134 in order to seal an annular gap between the rotating assembly 26 and the static structure 24.

Each of the components 28, 42, 44 and 148 is mounted to the rotatable base structure 40. The second rotatable body 44 is arranged axially between and may be abutted axially against a shoulder 156 of the rotatable base structure 40 at its second end 108 and the first rotatable body 42 at its end 120. The first rotatable body 42 is arranged axially between and may be abutted axially against the base 118 at its second end 48 and the inner race 148 at its first end 46. The inner race 148 is arranged axially between and may be abutted axially against the first rotatable body 42 and another element 158 of the rotating assembly 26; e.g., another rotatable body such as, but not limited to, another seal land. Each of the inner channels 86 may be fluidly coupled with one or more fluid passages 160 in/with the inner race 148 and/or one or more fluid passages 162 in/with the other element 158. In the specific embodiment of FIG. 1, the inner race 148 fluidly couples the other element 158 with the first rotatable body 42.

The fluid injector 32 is arranged radially outboard of the rotating assembly 26. The fluid injector 32 is configured to inject fluid (e.g., lubricant) into the bearing compartment 34 for providing that fluid to other components of the rotational equipment such as, but not limited to, one or more or each of the rotatable bodies 28, 42, 44, 148 and 158.

The fluid injector 32 includes one or more nozzle orifices 164 and 166. These nozzle orifices 164 and 166 may be fluidly coupled with and, thus, supplied with fluid (e.g., lubricant) from a common internal passage 168 within the fluid injector 32, and/or from respective discrete internal passages within the fluid injector 32.

Figure 6A:
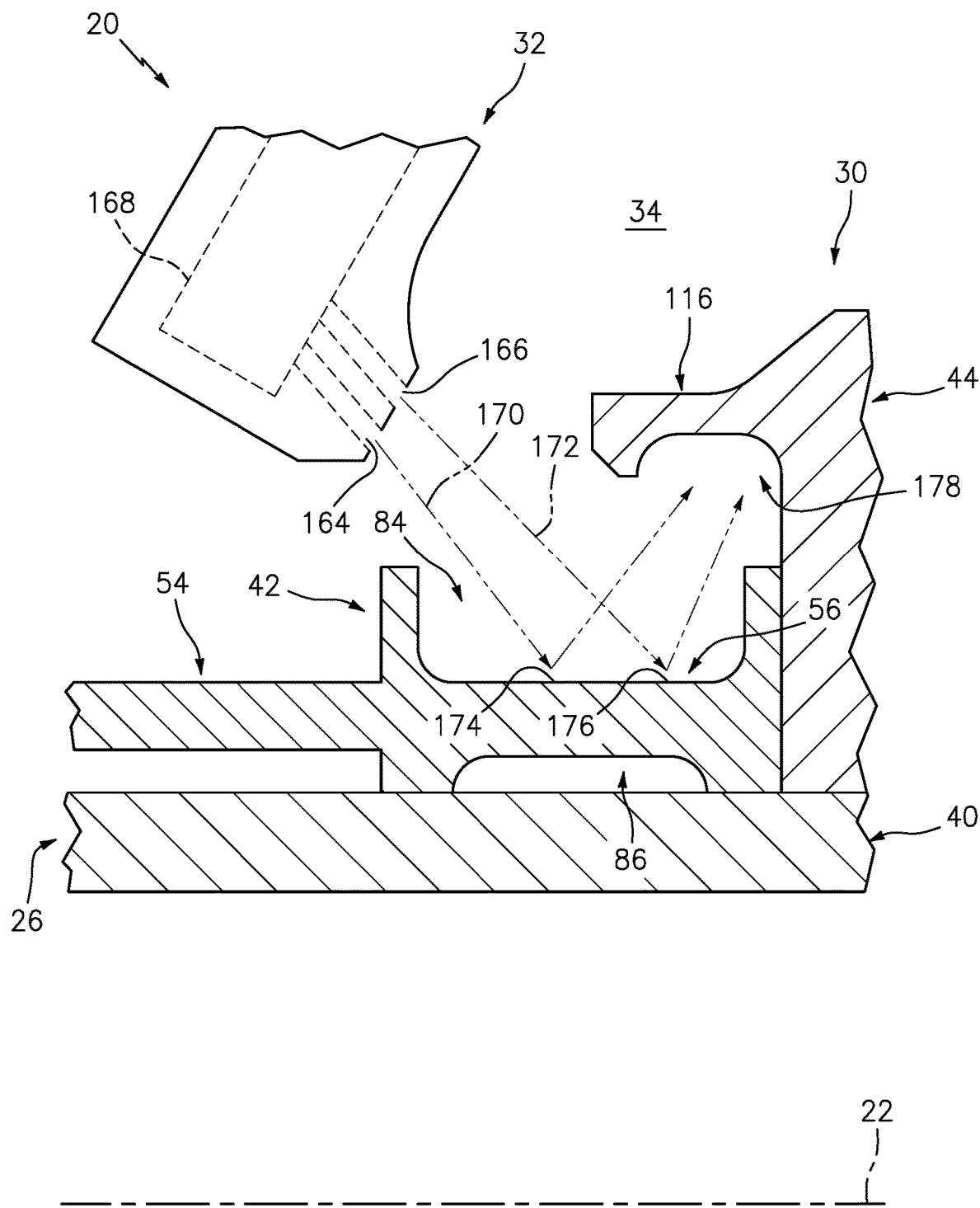
FIGS. 6A and 6B are partial side sectional illustrations of a portion of the rotational equipment assembly of FIG. 1 at different circumferential positions about the axial centerline.
Figure 6B:
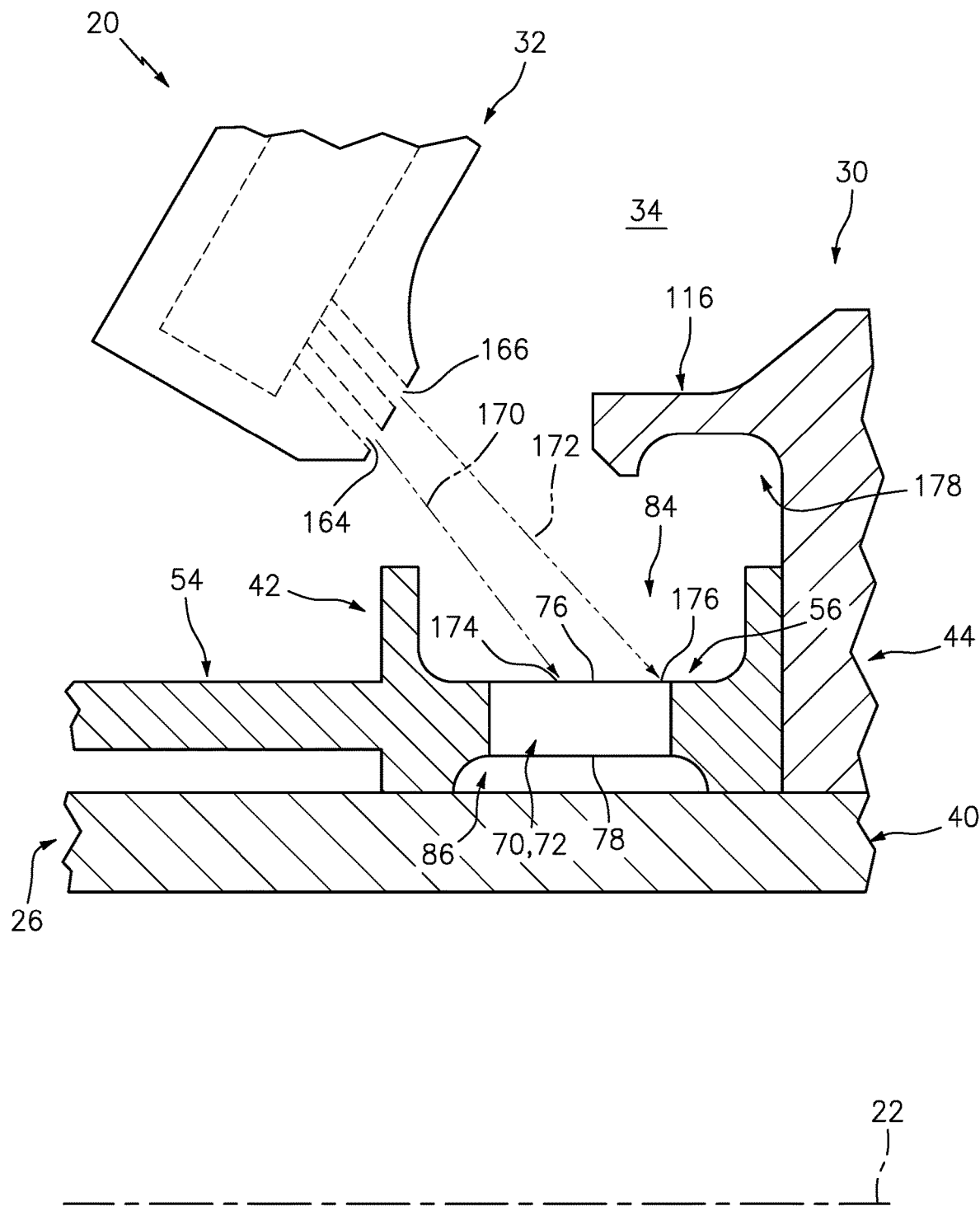

Referring to FIGS. 6A and 6B, each of the nozzle orifices 164 and 166 is configured to direct a respective fluid jet 170, 172 (e.g., a stream of fluid) out of the fluid injector 32, into the bearing compartment 34 (or another space) and to a respective target location 174, 176. In the embodiment of FIGS. 6A and 6B, the first and second target locations 174 and 176 are disposed at discrete axial locations along the axial centerline 22 and on the first rotatable body 42. However, the first and the second target locations 174 and 176 may (or may not) be circumferentially aligned.

Referring again to FIGS. 6A and 6B, the first and second target locations 174 and 176 are on the scoop portion 56 of the first rotatable body 42. Thus, when the first rotatable body 42 is at the rotational position of FIG. 6A about the axial centerline 22, the first and second target locations 174 and 176 may be coincident with a respective one of the outer channels 84. The first and the second nozzle orifices 164 and 166 are each thereby operable to direct at least a portion or an entirety of the respective fluid jet 170, 172 at and/or into the respective outer channel 84; e.g., each fluid jet 170, 172 is coincident with the respective outer channel 84. Similarly, when the first rotatable body 42 is at the rotational position of FIG. 6B about the axial centerline 22, the first and second target locations 174 and 176 may be coincident with a respective one of the first scoop passage inlets 76. The first and the second nozzle orifices 164 and 166 are each thereby operable to direct at least a portion or an entirety of the respective fluid jet 170, 172 at and/or into the respective first scoop aperture inlet 76; e.g., each fluid jet 170, 172 is coincident with the respective first scoop aperture inlet 76. Each first rotatable body scoop 70 in the first rotatable body 42 is thereafter operable to direct at least a portion of the received fluid through the respective first scoop aperture 72 and to the downstream components; e.g., the inner race 148 and then the other element 158 (see FIG. 1).

In addition, while some of the fluid jets 170 and 172 flows into the first rotatable body scoops 70, a portion of the fluid jets 170 and/or 172 directed from the first and the second nozzle orifices 164 and 166 may also splash against the scoop portion 56 and flow into the second scoop 178; e.g., see FIG. 6A. The fluid jets 170 and/or 172, for example, may splash against an outer surface of the scoop portion (e.g., surface 64 and/or 90 in FIG. 2) and be redirected into the second scoop 178. The second rotatable body scoop 178 collects this fluid for directing into the fluid passages 128 (see FIGS. 5A and 5B). A single fluid injector (e.g., 32) may thereby provide fluid for cooling and/or lubricating various different components that are forward and aft of that injector. Of course, in other embodiments, the rotational equipment assembly 20 may alternatively include multiple injectors 32 and/or one or more additional injectors.

Referring to FIGS. 7A-C, under certain operating condition, the rotating assembly 26 may move (e.g., axially displace, translate, etc.) relative to the fluid injector 32. FIG. 7A depicts the rotating assembly components (e.g., 40, 42 and 44) under ideal conditions, which may also correspond to the component arrangement while the rotational equipment is non-operational. FIG. 7B depicts the rotating assembly components (e.g., 40, 42 and 44) under a forward displacement condition. FIG. 7C depicts the rotating assembly components (e.g., 40, 42 and 44) under an aft displacement condition. Notably, no matter whether under ideal conditions, under a forward displacement condition or an aft displacement condition, at least one of the fluid jets 170 and/or 172 may remain on target to provide fluid to the first rotatable body scoops 70. As a result, regardless of the condition, the downstream components (e.g., see FIG. 1, components 28, 148 and/or 158) will continue to receive the fluid for lubrication and/or cooling. By contrast, referring to FIGS. 8A-C, where a fluid injector 800 includes a single nozzle orifice 802 and/or relatively small aperture inlets 804, downstream components may be periodically starved of fluid for lubrication and/or cooling under a forward displacement condition (see FIG. 8B) and/or an aft displacement condition (see FIG. 8C). Furthermore, fluid that misses the aperture inlets 804 may splash into a compartment and miss an adjacent axial scoop (not shown) positioned axially to a side of the radial scoop 806. By contrast, since the second rotatable body scoop 178 of FIGS. 7A-C at least partially (or completely) axially overlaps the first rotatable body scoops 70 and their inlets 76, the second rotatable body scoop 178 may collect any fluid that misses the first rotatable body scoops 70 due to axial misalignment.

Figure 9:
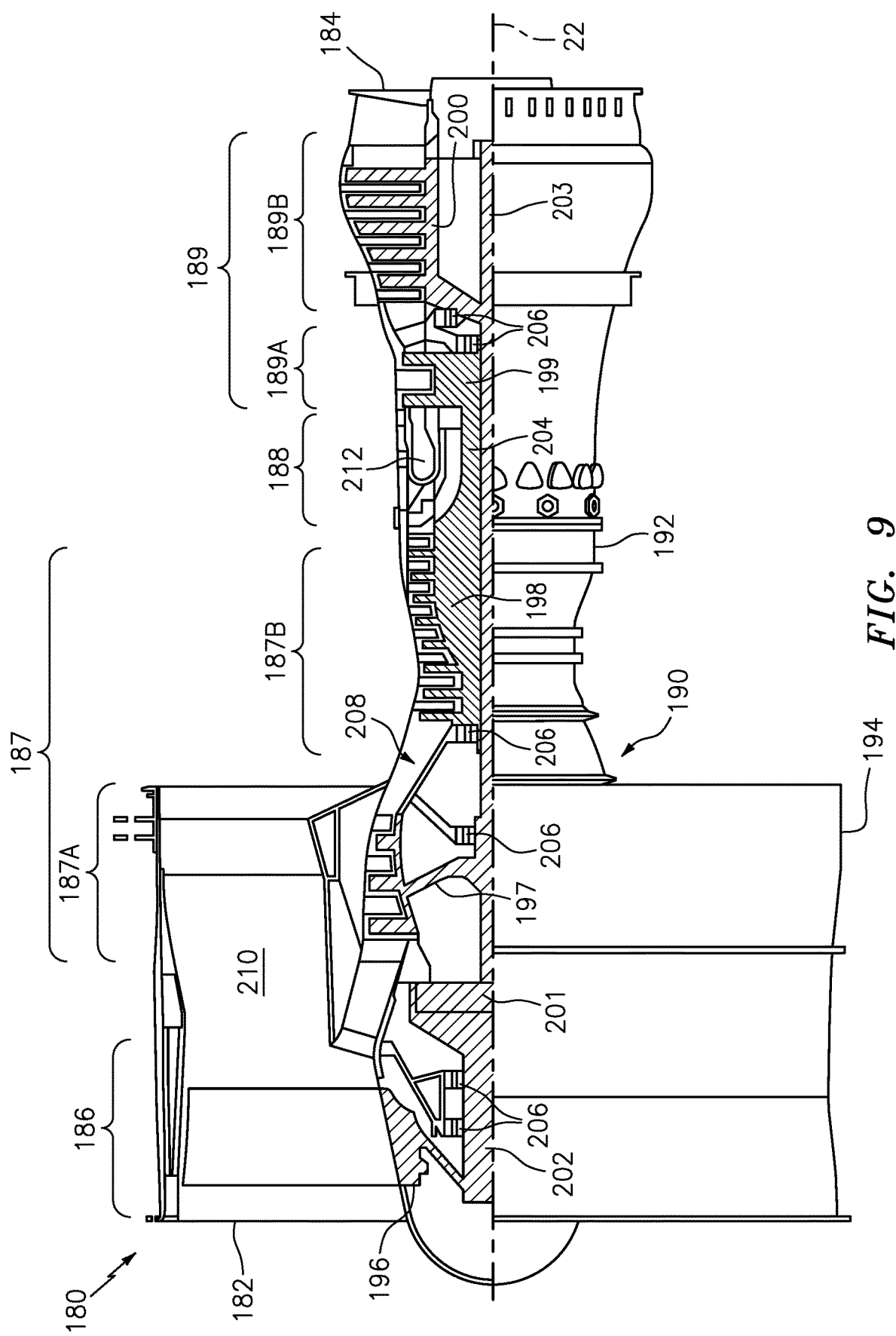
FIG. 9 is a side cutaway illustration of a gas turbine engine which may be configured with the rotational equipment assembly of FIG. 1.

FIG. 9 is a side cutaway illustration of a geared turbine engine 180 with which the rotational equipment assembly 20 of FIG. 1 may be configured. The turbine engine 180 extends along an axial centerline (e.g., the centerline 22) between an upstream airflow inlet 182 and a downstream airflow exhaust 184. The turbine engine 180 includes a fan section 186, a compressor section 187, a combustor section 188 and a turbine section 189. The compressor section 187 includes a low pressure compressor (LPC) section 187A and a high pressure compressor (HPC) section 187B. The turbine section 189 includes a high pressure turbine (HPT) section 189A and a low pressure turbine (LPT) section 189B.

The engine sections 186-189B are arranged sequentially along the axial centerline 22 within an engine housing 190. This engine housing 190 includes an inner case 192 (e.g., a core case) and an outer case 194 (e.g., a fan case). The inner case 192 may house one or more of the engine sections 187A-189B; e.g., an engine core. This inner case 192 may include or may be connected to the static structure 24 of FIG. 1. The outer case 194 may house at least the fan section 186.

Each of the engine sections 186, 187A, 187B, 189A and 189B includes a respective rotor 196-200. Each of these rotors 196-200 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 196 is connected to a gear train 201, for example, through a fan shaft 202. The gear train 201 and the LPC rotor 197 are connected to and driven by the LPT rotor 200 through a low speed shaft 203. The HPC rotor 198 is connected to and driven by the HPT rotor 199 through a high speed shaft 204. The shafts 202-204 are rotatably supported by a plurality of bearings 206; e.g., rolling element and/or thrust bearings. Each of these bearings 206 is connected to the engine housing 190 by at least one stationary structure such as, for example, an annular support strut. The rotatable base structure 40 of FIG. 1 may be configured as any one of the shafts 202-204 or a component mounted thereto or otherwise rotatable therewith, and the bearing 28 of FIG. 1 may be configured as any one of the bearings 206.

During operation, air enters the turbine engine 180 through the airflow inlet 182. This air is directed through the fan section 186 and into a core gas path 208 and a bypass gas path 210. The core gas path 208 extends sequentially through the engine sections 187A-189B. The air within the core gas path 208 may be referred to as "core air". The bypass gas path 210 extends through a bypass duct, which bypasses the engine core. The air within the bypass gas path 210 may be referred to as "bypass air".

The core air is compressed by the compressor rotors 197 and 198 and directed into a combustion chamber 212 of a combustor in the combustor section 188. Fuel is injected into the combustion chamber 212 and mixed with the compressed core air to provide a fuel-air mixture. This fuel air mixture is ignited and combustion products thereof flow through and sequentially cause the turbine rotors 199 and 200 to rotate. The rotation of the turbine rotors 199 and 200 respectively drive rotation of the compressor rotors 198 and 197 and, thus, compression of the air received from a core airflow inlet. The rotation of the turbine rotor 200 also drives rotation of the fan rotor 196, which propels bypass air through and out of the bypass gas path 210. The propulsion of the bypass air may account for a majority of thrust generated by the turbine engine 180, e.g., more than seventy-five percent (75%) of engine thrust. The turbine engine 180 of the present disclosure, however, is not limited to the foregoing exemplary thrust ratio.

The rotational equipment assembly 20 may be included in various turbine engines other than the one described above as well as in other types of rotational equipment. The rotational equipment assembly 20, for example, may be included in a geared turbine engine where a gear train connects one or more shafts to one or more rotors in a fan section, a compressor section and/or any other engine section. Alternatively, the rotational equipment assembly 20 may be included in a turbine engine configured without a gear train. The rotational equipment assembly 20 may be included in a geared or non-geared turbine engine configured with a single spool, with two spools (e.g., see FIG. 9), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
    a first rotatable body extending axially along and circumferentially about a rotational axis, the first rotatable body comprising a first scoop with a first scoop aperture that extends obliquely through the first rotatable body;
    an injector including a first nozzle orifice and a second nozzle orifice, the injector configured to direct a first fluid jet from the first nozzle orifice into an inlet of the first scoop aperture, and the injector further configured to direct a second fluid jet from the second nozzle orifice into the inlet of the first scoop aperture; and
    a second rotatable body extending axially along and circumferentially about the rotational axis, a base of the second rotatable body abutted axially against the first rotatable body;
    the second rotatable body comprising a second scoop with a scoop arm projecting axially out from the base of the second rotatable body.

2. The assembly of claim 1, wherein
    the first rotatable body further includes a second first scoop with a second first scoop aperture that extends obliquely through the first rotatable body;
    the injector is configured to direct the first fluid jet from the first nozzle orifice into an inlet of the second first scoop aperture; and
    the injector is further configured to direct the second fluid jet from the second nozzle orifice into the inlet of the second first scoop aperture.

3. The assembly of claim 1, wherein the first scoop aperture extends obliquely through the rotatable body along a first scoop aperture centerline, and the first scoop aperture centerline includes, relative to the rotational axis, a circumferential component and a radial component.

4. The assembly of claim 1, wherein
    the first scoop further includes a scoop channel fluidly coupled with the first scoop aperture; and
    the scoop channel projects radially towards the rotational axis into the first rotatable body, and the scoop channel extends circumferentially within the first rotatable body.

5. The assembly of claim 4, wherein the scoop channel extends circumferentially within the first rotatable body to the inlet of the first scoop aperture.

6. The assembly of claim 1, wherein
    the first scoop further includes a scoop channel fluidly coupled with the first scoop aperture; and
    the scoop channel projects radially away from the rotational axis into the first rotatable body, and the scoop channel extends circumferentially within the first rotatable body.

7. The assembly of claim 6, wherein the scoop channel further extends axially into the first rotatable body.

8. The assembly of claim 1, further comprising:
    an additional rotatable body extending axially along and circumferentially about the rotational axis, the additional rotatable body abutted axially against the first rotatable body;
    the first rotatable body configured to direct fluid received from the first nozzle orifice and the second nozzle orifice to the additional rotatable body.

9. The assembly of claim 8, wherein the additional rotatable body comprises an inner race of a bearing.

10. The assembly of claim 1, wherein the scoop arm axially overlaps at least a portion of the first scoop.

11. The assembly of claim 1, wherein the second scoop is configured to collect fluid from at least one of the first fluid jet or the second fluid jet that splashes off of the first rotatable body.

12. The assembly of claim 1, wherein the second rotatable body comprises a seal land.

13. The assembly of claim 1, wherein
    the injector is configured to direct the first fluid jet from the first nozzle orifice to a first target location on the first rotatable body which is at least partially axially aligned with the inlet when the first rotatable body is at a first rotational position about the rotational axis;
    the injector is further configured to direct the second fluid jet from the second nozzle orifice to a second target location on the first rotatable body which is at least partially axially aligned with the inlet when the first rotatable body is at the first rotational position about the rotational axis; and
    the first target location and the second target location are discretely arranged axially along the rotational axis.

14. The assembly of claim 13, wherein the first target location and the second target location are circumferentially aligned about the rotational axis.

15. The assembly of claim 1, further comprising a gas turbine engine rotating assembly comprising the first rotatable body, wherein the rotational equipment comprises a gas turbine engine.

16. An assembly for rotational equipment, comprising:
    a first tubular body configured to rotate about a rotational axis, the first tubular body comprising a first scoop aperture with a first scoop aperture inlet and a first scoop aperture outlet, and the first scoop aperture extending from the first scoop aperture inlet at a radial outer surface of the first tubular body to the first scoop aperture outlet at a radial inner surface of the first tubular body; and
    an injector including a first nozzle orifice and a second nozzle orifice, the injector configured to direct a first fluid jet from the first nozzle orifice to a first target location that is coincident with the first scoop aperture inlet, and the injector further configured to direct a second fluid jet from the second nozzle orifice to a second target location that is coincident with the first scoop aperture inlet.

17. An assembly for rotational equipment, comprising:
a first rotatable body extending axially along and circumferentially about a rotational axis, the first rotatable body comprising a first scoop with a first scoop aperture that extends obliquely through the first rotatable body; and
a second rotatable body extending axially along and circumferentially about the rotational axis, the second rotatable body comprising a second scoop with a scoop arm projecting axially out from a base of the second rotatable body, and the scoop arm axially overlapping at least a portion of an inlet to the first scoop aperture, wherein the second scoop is configured to collect fluid that splashes off of the first rotatable body.

18. The assembly of claim 17, wherein the base of the second rotatable body is abutted axially against the first rotatable body.

19. The assembly of claim 17, further comprising a lubricant injector configured to direct a first lubricant jet at the inlet of the first scoop aperture when the first rotatable body is at a first rotational position about the rotational axis, wherein the second scoop is configured to collect lubricant from the first lubricant jet that splashes off of the first rotatable body when the first rotatable body is at a second rotational position about the rotational axis.

* * * * *